United States Patent [19]

Asaga

[11] 4,116,189
[45] Sep. 26, 1978

[54] INTERNAL COMBUSTION ENGINE

[76] Inventor: Ryuzi Asaga, 1-10 No. 579 Fukuzumi Oshibedani-cho, Tarumi-ku, Kobe City, Japan

[21] Appl. No.: 753,686

[22] Filed: Dec. 23, 1976

[51] Int. Cl.$^2$ ............................................. F01L 7/00
[52] U.S. Cl. ........................... 123/190 BB; 123/75 C; 123/80 BA; 123/190 BD; 123/190 D; 123/119 A
[58] Field of Search ............... 123/26, 37, 32 E, 75 B, 123/75 C, 80 BA, 190 BB, 190 BD, 190 BF, 190 D, 190 B, 119 A

[56] References Cited

U.S. PATENT DOCUMENTS

| | | | |
|---|---|---|---|
| 1,116,266 | 11/1914 | Gueret | 123/75 C |
| 1,595,607 | 8/1926 | Jones | 123/75 C |
| 1,613,466 | 1/1927 | Lawrence | 123/190 BB |
| 1,663,075 | 3/1928 | Frazier | 123/190 BD |
| 1,693,484 | 11/1928 | Johnson | 123/75 C |
| 1,833,802 | 11/1931 | Violet | 123/75 C |
| 1,868,301 | 7/1932 | Zeemah | 123/190 BD |
| 2,048,134 | 7/1936 | Montalto | 123/190 BD |
| 2,701,556 | 2/1955 | Woerner | 123/119 A |
| 3,799,130 | 3/1974 | Dahlstrom | 123/75 C |

Primary Examiner—Charles J. Myhre
Assistant Examiner—David D. Reynolds
Attorney, Agent, or Firm—McGlew and Tuttle

[57] ABSTRACT

An internal combustion engine has a plurality of cylinders arranged in rows in an engine block, with reciprocable pistons in the cylinders. A cylindrical valve housing chamber is defined in the block over each row of cylinders and communicates with the cylinders through an inlet-exhaust passage in each cylinder. A rotary valve is rotatably mounted in the valve housing chamber and has a plurality of circumferentially spaced intake and exhaust passages with apertures defined in the valve surface which are selectively alignable over the inlet-exhaust passages of the respective cylinders. To further insure a complete burning of the air-fuel mixture, a bomb valve chamber is provided adjacent each cylinder haing a gas passage near the top of the pistons. The gas passage communicates the cylinder with the bomb valve chamber. A rotatable globe-draped bomb valve is selectively opened and closed to entrap a portion of the combustion products which are rich in unburned air-fuel mixture. This portion is then released to the cylinders in the subsequent intake stroke by rotation of the valve to be exposed to further burning in the subsequent combustion stroke of the cylinder.

7 Claims, 15 Drawing Figures

INTERNAL COMBUSTION ENGINE

FIELD AND BACKGROUND OF THE INVENTION

This invention relates in general to internal combustion engines and, in particular, to a new and useful engine having a rotary valve arrangement for admitting air and fuel and for venting exhaust, and a bomb valve chamber arrangement for entrapping a portion of exhaust and unburned air-fuel mixture and then releasing the portion into the combustion chambers of the engine on subsequent intake strokes so that the portion is again subject to burning.

DESCRIPTION OF THE PRIOR ART

The growing complexity of the internal combustion engine and the increasing requirements for anti-pollution characteristics in these engines has led to the design of alternate subsystems in the engines which do not conform to the traditional engine designs.

One such improvement has been the use of a rotary valve arrangement as disclosed in U.S. Pat. No. 3,945,359 for a "ROTOR ENGINE" which has been granted to the inventor herein. This arrangement has greatly reduced the complexity of the construction and the noise creating character of the prior art reciprocating valves. In addition to the inherent mechanical advantage of using a rotating valve rather than a reciprocating valve, an anti-pollution characteristic is also realized in that a constant swirling of the exhaust mixture can be set up and enhanced by appropriate baffle means associated with the exhaust ports of the rotary valve. This swilling effect is known to induce additional burning of the exhaust mixture after it leaves the cylinder so that there is a fuller burning of the air-fuel mixture and a reduction of such harmful products as carbon monoxide in the exhaust.

Another disadvantage of prior art engines has been the loss of power due to incomplete burning of air and fuel mixtures within the cylinder. The highest concentration of unburned air-fuel mixture in a cylinder at the end of a power or combustion stroke is known to be in the vicinity of the piston top surface when it is at the bottom of its stroke. The burning of air and fuel in the combustion stroke proceeds from the ignition means, which is usually a spark plug near the top of the cylinder, downwardly toward the piston and adjacent cylinder walls. As such, the last portion of the air and fuel to be exposed to burning is that portion nearest the top of the piston as the piston approaches the bottom of its stroke.

In addition to further improving the mechanical character of the internal combustion engine, the present invention is directed to a device for overcoming these difficulties.

SUMMARY OF THE INVENTION

The present invention comprises an internal combustion engine having at least one rotary valve member rotatably mounted in a series over one or more cylinders. Each of these members has an intake aperture and an exhaust aperture provided on its circumferential periphery which are axially aligned with, and circumferentially spaced from each other. These apertures communicate with respective intake and exhaust passages in the rotary valve member.

The intake passage extends from the intake aperture radially inwardly then axially along the member. The passage then extends radially outwardly toward the periphery again and ends at an intake opening in the member periphery. The rotary valve member is rotatably mounted in a substantially cylindrical rotary valve chamber or housing which has communicating intake and exhaust holes which lead to respective intake and exhaust means, such as, a carburetor and an exhaust manifold arrangement. The chamber is also communicable with respective cylinders through inlet-exhaust passages in each cylinder. The intake opening on the rotary valve member is at the same axial location as the intake hole in the valve chamber and is alignable therewith to provide a passage from the intake means to the cylinder interior through the intake aperture which is alignable with the inlet-exhaust passages. The circumferential periphery adjacent the intake opening at this axial location provides an intake hole cover when the intake opening is not aligned with the intake hole.

Similarly, the rotary valve members each have an exahust passage defined therein which begin adjacent the exhaust paerture, extend radially inwardly, then axially along the member in the opposite direction from the intake passage, and finally, extend radially outwardly to an exhaust opening on the member periphery which is adjacent the axial location of the exhaust hole in the chamber. The exhaust opening is alignable with this exhaust hole to provide a passage for exhaust or combustion products coming from the cylinders, to the exhaust means through the exhaust aperture which is alignable with the inlet-exhaust passage.

In the axial vicinity of this exhaust opening a cup-shape exhaust cover is provided which partially covers the exhaust opening. The exhaust cover induces a swirling of the exhaust as it leaves the cylinder and enhances the continued combustion of unburned air and fuel within the rotary value chamber or housing before the combustion products are finally vented to the exhaust means.

A series of spheroidal rotary bomb valve members is provided in a bomb valve chamber or housing in the side wall of the cylinders. These bomb valve members are rotatable in the bomb valve chamber and are mutually connected and axially aligned for rotation. The bomb valve chamber is in communication with the respective cylinders through respective gas inlet passages therebetween. The bomb valve member has a gas space defined therein which communicates with the bomb valve chamber through a gas inlet port in the bomb valve member. The gas inlet port is alignable with the gas inlet passage to provide communication between the cylinder interior and the gas space in the bomb valve member. The gas inlet passage is provided in the cylinder wall adjacent the top of the piston when it is in the bottom of its stroke within the cylinder. The bomb valve members are rotated in synchronous relationship with the reciprocation of the pistons so that the gas inlet passage is opened at the bottom of each stroke.

In operation, the open gas space admits a portion of combustion products under pressure, from the cylinder which is rich in unburned air and fuel mixture, at the end of a combustion stroke. This portion is then released to the cylinder on the subsequent suction or intake stroke of the piston and the portion is again subject to burning in the still later combustion stroke. The placement of the gas passge near the top of the piston when at the bottom of the piston stroke ensures the richness of the gas portion in unburned air and fuel.

Accordingly, an object of the invention is to provide an internal combustion engine which more completely burns air and fuel supplied thereto.

A further object of the invention is to provide an engine which better utilizes the air and fuel by increasing the power yielded by the air and fuel use in the engine.

Another object of the invention is to provide an engine which enhances the combustion of unburned air and fuel after it leaves the cylinders and before it is vented out of the engine.

A further object of the invention is to provide and internal combustion engine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
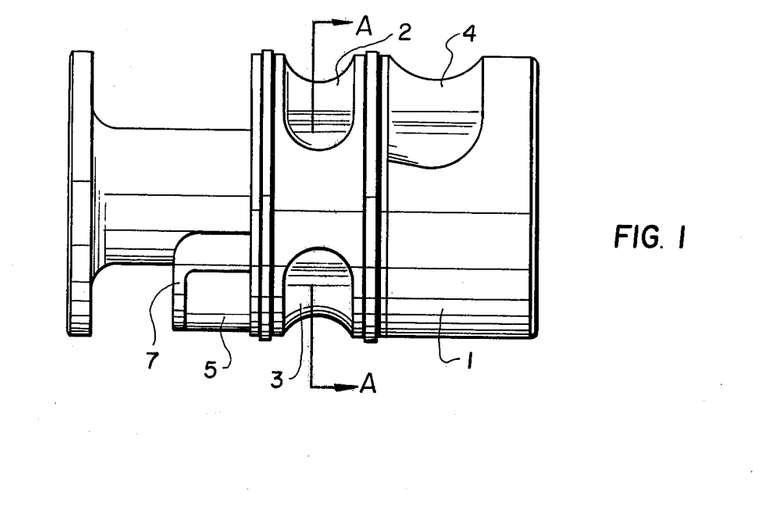
FIG. 1 is an elevational view of a rotary valve member, constructed in accordance with the invention.
Figure 2:
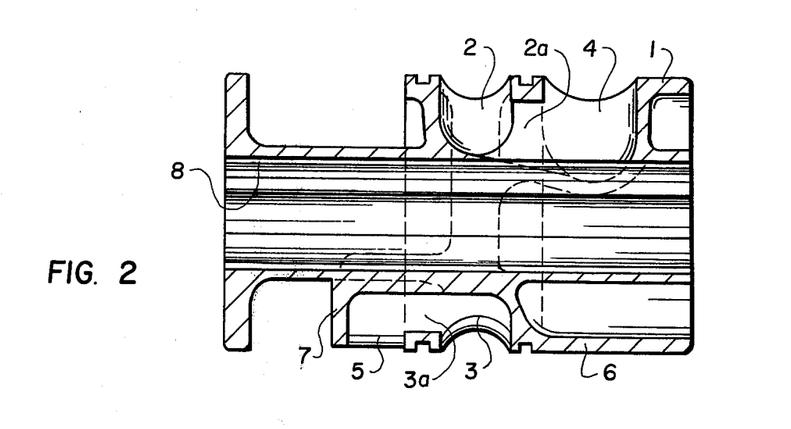
FIG. 2 is a longitudinal cross-sectional view of the rotary valve member shown in FIG. 1.
Figure 3:
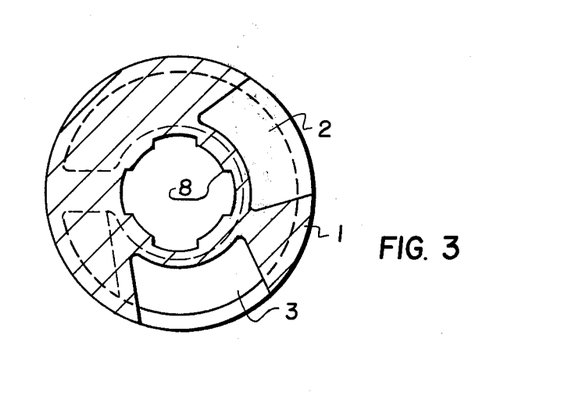
FIG. 3 is a side view of the rotary valve member shown in FIG. 1 taken along the line A—A.
Figure 4:
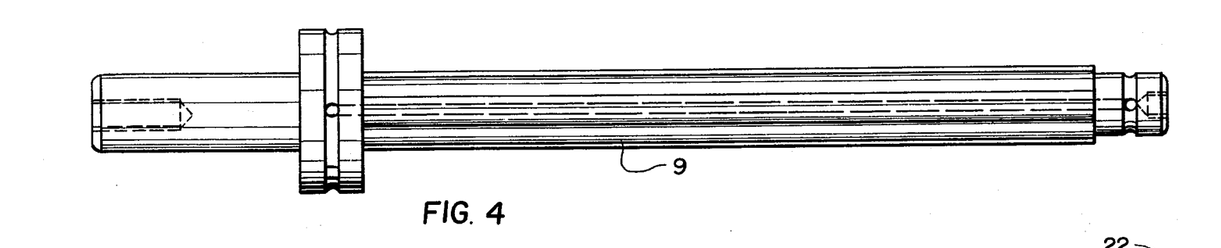
FIG. 4 is an elevational view of a spline shaft constructed in accordance with the invention.

Referring to the drawings in particular, the invention embodied therein as seen in FIG. 1, comprises a substantially cylindrical rotary valve member 1 having an intake aperture 2 and an exhaust aperture 3 at circumferentially spaced and axially aligned positions thereon. As best seen in FIG. 2, the intake aperture 2 connects with an intake opening 4 through an axially extending intake passage 2a. The exhaust aperture connects with an exhaust opening 5 through an exhaust passage 3a, which axially extends in the opposite direction. An exhaust cover 6 is provided in the circumferential vicinity of intake opening 4 and a cup-shape exhaust cover 7 is provided over the exhaust opening 5. A spline 8 is defined in each rotary valve member which is adapted to receive a spline shaft 9, as shown in FIG. 4. The circumferential spacing of intake and exhaust apertures 2 and 3 is shown in FIG. 3, and is critical for the proper timing of exhaust and intake strokes as will be described later herein.

Figure 13:
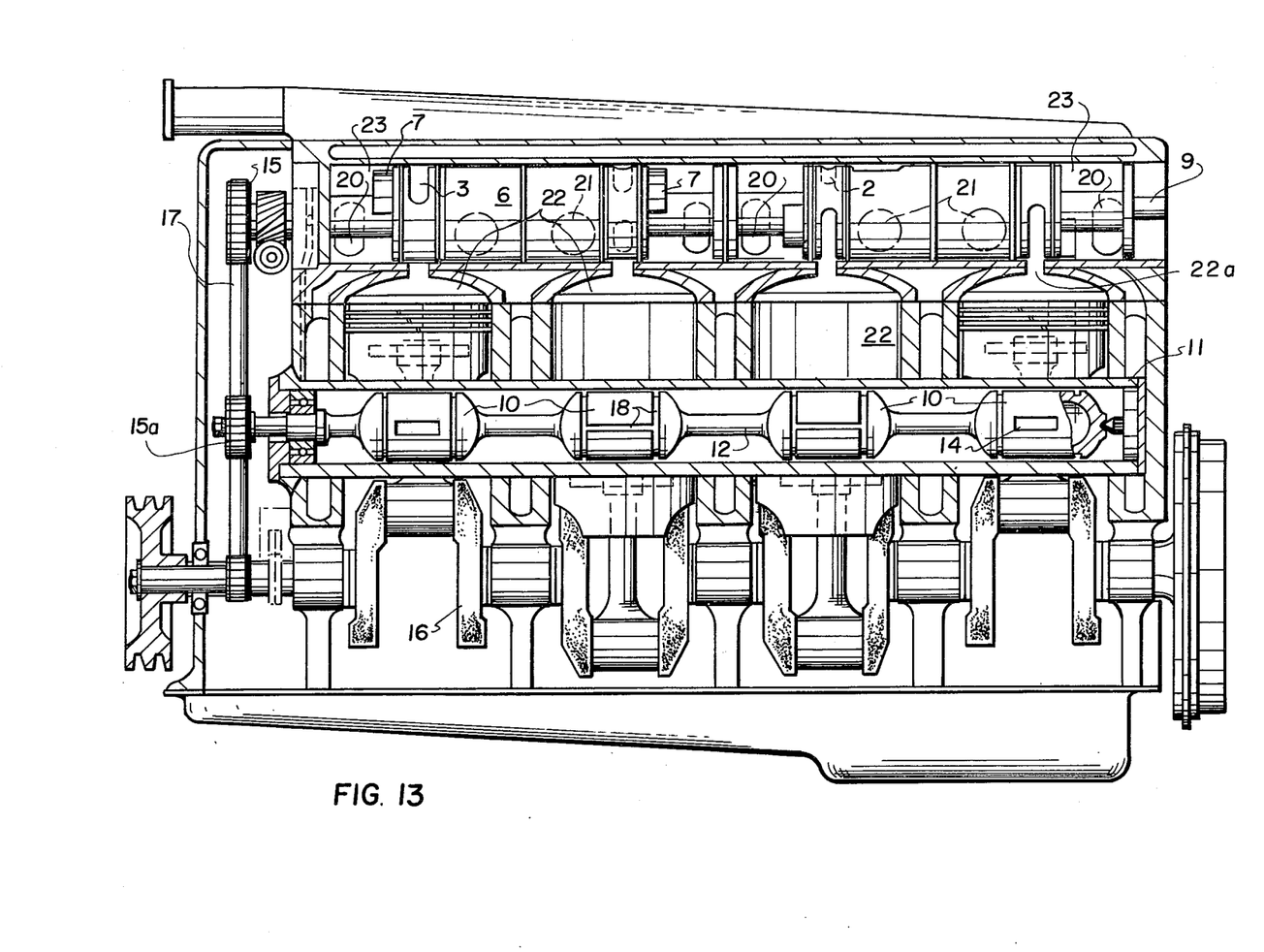
FIG. 13 is an elevational view of an engine constructed in accordance with the invention.

The several rotary members 1 are arranged in series on spline shaft 9 for rotation in a rotary valve chamber or housing 23 above the cylinders 22, as best seen in FIG. 13.

Figure 5:
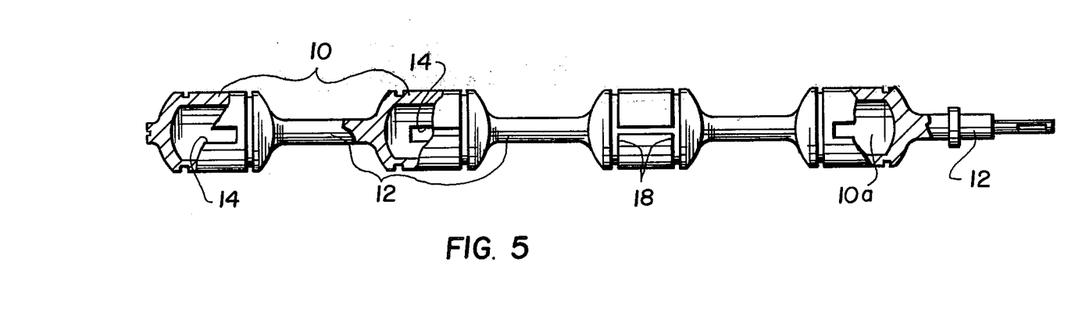
FIG. 5 is an elevational view, partly in section, of the rotary bomb valve member series of the invention.

FIG. 5 shows a series of bomb valve members 10, arranged for rotation on an integrally formed shaft 12. Each bomb valve member 10 has a substantially spheroidal shape and has defined therein a gas entrapping space 10a. A gas inlet port 14 is also defined in the bomb valve member 10 and oil grooves 18 are provided for lubrication thereof.

Figure 6:
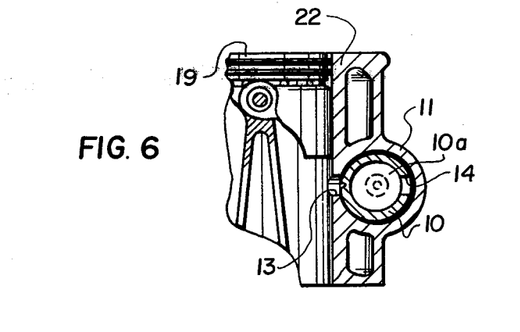
FIG. 6 is a partial and enlarged view of the cylinder and one bomb valve member in its closed state.

As shown in FIGS. 6 and 13, bomb valve members 10 are rotatably mounted in a bomb valve chamber or housing 11, adjacent the side walls of cylinder 22. Each cylinder 22 has a piston 19 and has defined therein a gas inlet passage 13 adjacent the top surface of piston 19 when it is at the bottom of its stroke.

Spline shaft 9 of the rotary valve members and shaft 12 of the bomb valve members are rotatable by a crank shaft 16 through a drive chain 17 and respective sprockets 15 and 15a. The circumferential placement of gas inlet ports 14 on neighboring bomb valve members 10 are 180° for a four cylinder engine so that the bomb valve gas space 10a will be open to the cylinder interior when two of the cylinders are at the end of their respective intake and combustion strokes. The spacing for engines having 6 or 8 in-line cylinders will thus be 120° and 90°, respectively.

Figures 14, 15:
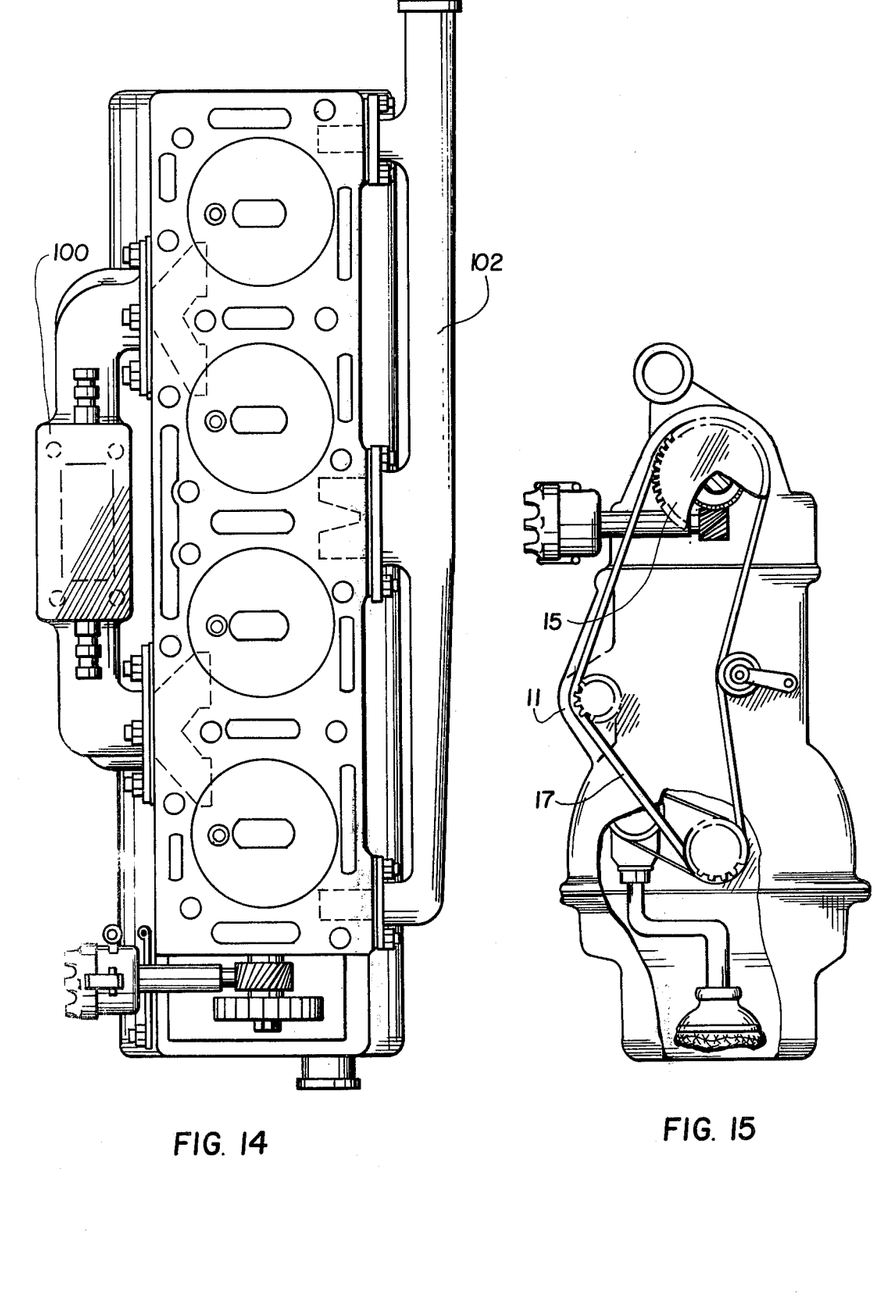
FIG. 14 is a plan view of the engine shown in FIG. 13.
FIG. 15 is an end view of the engine shown in FIG. 13.

The interiors of the cylinders 22 and the rotary valve chamber 23 are connected by communicating inlet-exhaust passages 22a adjacent the top of each cylinder, as best seen in FIG. 13. At the axial positions of the several intake openings are intake holes 21 defined in the chamber 23, associated with each cylinder 22. Similarly, adjacent the axial position of the several exhaust openings 5 are exhaust holes 20. The intake holes are connected to a carburetor 100 (FIG. 14) which provides an air-fuel mixture to the cylinders through the rotary valve members. The exhaust holes are connected to an exhaust manifold 102 for the venting of combustion products or exhaust from the cylinders through the rotary valve members 1.

With intake apertures 2 aligned with inlet-exhaust passages 22a and intake openings 4 aligned with intake holes 21, passages 2a provide communication between the cylinders 22 and the carburetor 100 for the admission of air and fuel. With exhaust apertures 3 aligned with inlet-exhaust passages 22a and exhaust openings 5 aligned with exhaust holes 20, passage 3a provides communication between the cylinders 22 and the exhaust manifold 102.

By proper spacing of the various apertures and openings on the several rotary valve members and the synchronous rotation of the members through crank shaft 16, chain drive 17 and sprocket 15, the functioning of conventional reciprocating valves can be duplicated.

Figure 7:
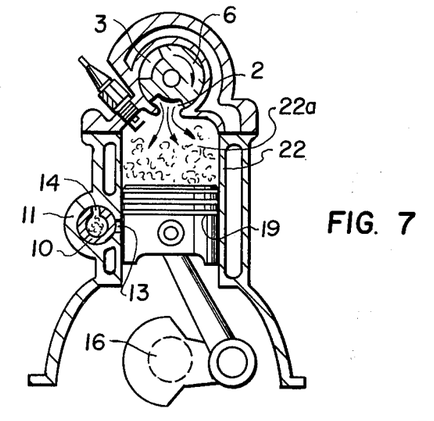
FIG. 7 is a longitudinal cross-section of one cylinder during the suction or intake stroke of the piston.

The operation of one cylinder of the engine in accordance with the invention is as follows:

At the beginning of a suction or intake stroke of piston 19 (FIG. 7), air and fuel enters the cylinder 22 through intake aperture 2, which has been rotated into alignment with the inlet-exhaust passage 22a of the cylinder. At this point, the bomb valve member is in a position with gas port 14 abutting against the wall of the bomb valve chamber 11 so that the contents of the gas space 10a is confined.

At the end of the intake stroke (FIG. 8), the bomb valve member has been rotated so that the gas port 14 is in alignment with the gas inlet passage 13 and the confined gas is thus released to the cylinder. This gas is a portion of the combustion products which are rich in unburned air and fuel from the previous power or combustion stroke. At the same time, the rotary valve member has rotated so that the intake aperture 2 is no longer open to the passage 22a, and the intake hole 21 of FIG. 13 is covered by the intake cover 6 in order to prevent the escape of air-fuel mixture therefrom.

Figures 8, 9:
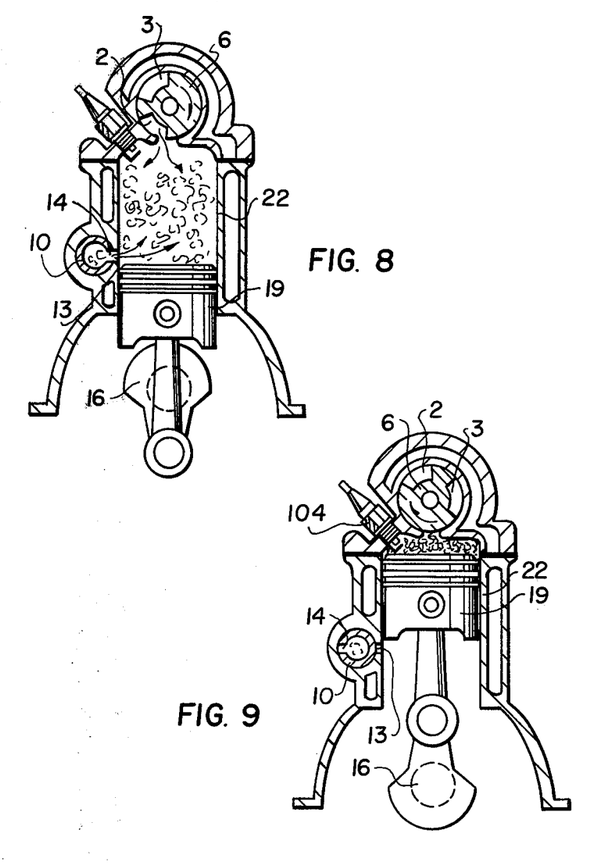
FIG. 8 is a view similar to FIG. 7 with the piston at the end of its suction or intake stroke.
FIG. 9 is a view similar to FIG. 7 with the piston at the end of its compression stroke.
Figure 10:
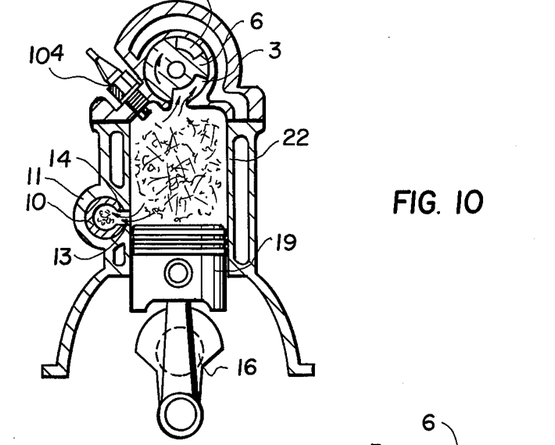
FIG. 10 is a view similar to FIG 7 with the piston at the end of its power or combustion stroke.

As piston 19 reaches the top of its stroke, as seen in FIG. 9, the spark plug 104 is activated, and the air-fuel mixture is ignited. At the end of the power stroke, FIG. 10, the rotary valve member 1 is rotated so that aperture 3 is placed into alignment with the inlet-exhaust passage 22a and the gas port 14 of the bomb valve member 10 is aligned with the gas inlet passage 13 of the cylinder. At this point, due to the high pressure of the combustion products, a portion of these products near the top of the piston is forced into the gas space 10a of the member 10. Due to the position of the gas inlet passage 13, a portion of combustion products which are rich in unburned air and fuel is entrapped in the gas space 10a.

Figure 11:
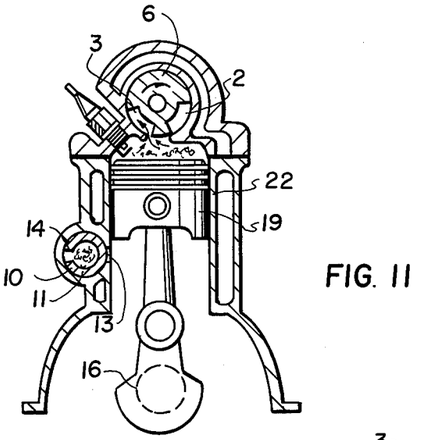
FIG. 11 is a view similar to FIG. 7 with the piston at the end of its exhaust stroke.

At the end of the exhaust stroke, see FIG. 11, the exhaust aperture 3 has been rotated away from the inlet-exhaust passage 22a. Due to the swirling effect of the exhaust cover 7, the continued burning of unburned air and fuel is enhanced in the rotary valve chamber 23 adjacent the exhaust hole 20. The bomb valve member at this point has been closed and the gas space therein retains the portion of combustion products entrapped.

Figure 12:
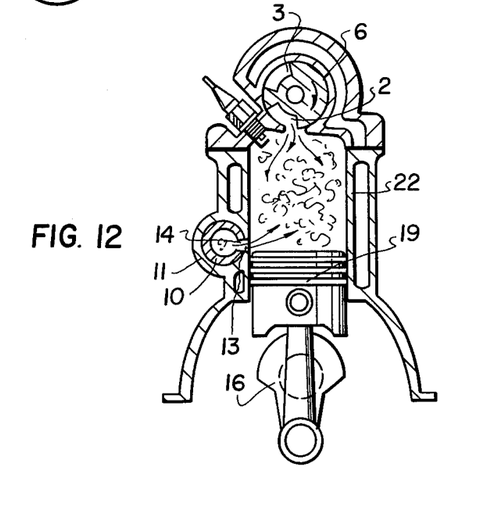
FIG. 12 is a view identical to FIG. 8 showing the beginning of the next power stroke and the end of the next suction or intake stroke.

The suction or intake stroke is then repeated, as seen in FIG. 12, and the entrapped portion of gas is released to the cylinder to be re-exposed to burning in the subsequent combustion stroke so that the unburned air and fuel of the combustion products is further reduced.

Thus, according to the present invention, the unburned gas which, in conventional engines, has been expelled by the piston from the cylinder and, therefore wasted, is retained in the rotary bomb valve 10 until the succeeding suction stroke and is emitted by the pressure thereof into a portion of lean gas mixture in the cylinder due to the pressure difference, thus improving the uniformity of the gas mixture in the cylinder and extending the combustion time to minimize the emission of unburned hydrocarbons. Additionally, the complete recombustion prevents the formation of CO, thus preventing emission of undesirable hydrocarbons and carbon monoxide. Furthermore, the uniform state of the mixture which is obtained in the cylinder achieves a slower combustion and a reduced formation of nitrogen oxides. In addition, the utilization of conventionally wasted unburned gas for recombustion increases the power output and economizes the consumption of fuel. Further, the use of rotary valves prevents chattering of the valves even at high speed revolution of the engine and results in a stable operation without noise.

Furthermore, in accordance with the invention, the use of a rotary valve chamber in the water jacket, located in the cylinder head, enables secondary combustion of the exhaust gas with an ample combustion time, thereby, improving the efficiency of the engine and significantly reducing the undesirable components in the exhaust gas. Although such a combustion chamber is singly applicable in conventional engines, it will be understood that, in the present invention, the exahust resulting from complete combustion in the cylinder is further subjected to secondary combustion in the chamber to achieve further advanced elimination of undesirable components. The present invention is also effective in improving the power output of the engine due to the freedom in selecting the dimension of the intake-exhaust apertures and in selecting the angle of cranks.

While a specific embodiment of the invention has been shown and described in detail to illustrate the application of the principles of the invention, it will be understood that the invention may be embodied otherwise without departing from such principles.

What is claimed is:

1. In an internal combustion engine having a block with at least one cylinder defined therein a piston reciprocable in the cylinder, a crank shaft connected to said piston and rotated thereby, said engine having intake means connected to said block for supplying air and fuel to said cylinder for ignition therein to form combustion products, and exhaust means connected to said block for venting said combustion products from said cylinder, the improvement comprising, in combination: said block having a valve housing chamber defined therein above said cylinder and connecting with said exhaust means, rotary valve means rotatably mounted in said valve housing chamber, inlet and exhaust passage means defined in said cylinder adjacent said valve housing chamber, said rotary valve means having a valve intake passage and a valve exhaust passage circumferentially spaced from said valve intake passage defined therein, said valve intake passage being communicable between said inlet passage means of said cylinder and the intake means for admitting air and fuel into said cylinder, said valve exhaust passage being communicable between said exhaust passage means of said cylinder and said valve housing chamber for venting said combustion products from said cylinder, and drive means connected between said crank shaft and said rotary valve means for rotation of said valve means; wherein said inlet and exhaust passage means of the cylinder comprise a single inlet-exhaust passage, said valve intake passage further comprising an intake aperture alignable over said inlet exhaust passage and an intake opening alignable with the intake means, and said valve exhaust passage further comprises an exhaust aperture alignable over said inlet-exhaust passage circumferentially spaced and in the same diametric plane as said intake aperture, and an exhaust opening communicated with said valve housing chamber, said exhaust opening is partially covered by an exhaust cover connected to said rotary valve means for deflecting the combustion products as they leave the cylinder through said inlet-exhaust passage and said exhaust aperture to induce a swirling of the products and enhance the recombustion of unburned fuel in said valve housing chamber.

2. In an internal combustion engine having a block with at least one cylinder defined therein, a piston reciprocable in the cylinder, a crank shaft connected to said piston and rotated thereby, said engine having intake means connected to said block for supplying air and fuel to said cylinder for ignition therein to form combustion products, and exhaust means connected to said block for venting said combustion products from said cylinder, the improvement comprising, in combination: said block having a valve housing and a valve housing chamber defined therein above said cylinder and connecting with said exhaust means, rotary valve means rotatably mounted in said valve housing chamber, inlet and exhaust passage means defined in said cylinder adjacent said valve housing chamber, said rotary valve means having a valve intake passage and a valve exhaust passage circumferentially spaced from said valve intake passage defined therein, said valve intake passage being communicable between said inlet passage means of said cylinder said valve housing having an exhaust passage and the intake means for admitting air and fuel into said cylinder, said valve exhaust passage being communicable between said exhaust passage means of said cylinder and said valve housing chamber for venting said combustion products from said cylinder, an exhaust cover connected to said rotary valve means covering a portion of said exhaust passage in said valve housing chamber, and drive means connected between said crank shaft and said rotary valve means for rotation of said valve means, said block having a closed bomb valve chamber defined therein adjacent said cylinder, the cylinder having a gas inlet passage defined therein and communicating the cylinder with the bomb valve chamber, and bomb valve means movably mounted in said bomb valve chamber for opening said gas inlet passage when the piston is below said gas inlet passage and closing said gas inlet passage when the piston is above said gas inlet passage, said bomb valve means further comprises a bomb valve member rotatably mounted in said bomb valve chamber and having a circumferential gas inlet port alignable with said gas inlet passage of the cylinder to open said gas inlet passage.

3. The improvement in an internal combustion engine, as claimed in claim 2, which further comprises a bomb valve drive means connected between said bomb valve and the crank shaft for synchronous rotation of said crank shaft and said spherical bomb valve and wherein said rotary valve means, said bomb valve, and the crank shaft are axially parallel and substantially perpendicular to the reciprocal motion of the piston.

4. A method of operating an internal combustion engine comprising, supplying an air-fuel mixture to a cylinder of said internal combustion engine through a rotary valve chamber having a rotary valve therein while the piston in said cylinder is moving toward the bottom of its stroke, allowing unburned air-fuel mixture to enter said cylinder from a separate bomb valve chamber having an opening into said cylinder when said piston is substantially at the bottom of its stroke, permitting said piston to move upwardly in said cylinder to compress said air-fuel mixture and any unburned air-fuel mixture in said cylinder, igniting said air-fuel mixture to form combustion products and unburned air-fuel mixture to move the piston downwardly again, allowing a portion of said products and unburned air-fuel mixture in said cylinder to enter said bomb valve chamber as said piston returns to the bottom of its stroke in said cylinder, and permitting said piston to rise and exhaust the remainder of said products and unburned air-fuel mixture through said rotary valve while causing said products and unburned air-fuel mixture to be violently deflected by an exhaust cover so as to be subjected to recombustion in said rotary valve as said products and mixture leave said cylinder.

5. A multi-stroked internal combustion engine, comprising at least one combustion chamber having intake means for admitting an air-fuel mixture into the combustion chamber to be burned and exhaust means for venting combustion products formed by the burning of the air-fuel mixture, rotary valve means communicable with the combustion chamber for admitting the air-fuel mixture and venting the combustion products of the engine from the combustion chamber and bomb valve means spaced from said rotary valve means and communicable with the combustion chamber in the engine for entrapping a portion of the combustion products containing unburned air-fuel mixture, and releasing said portion into the combustion chamber on a subsequent stroke of the engine, said combustion chamber further comprises a cylinder disposed in the engine, having a piston reciprocable therein, said rotary valve means further comprises a substantially cylindrical rotary valve, rotatably mounted adjacent at least a portion of said cylinder, the axis of rotation of said rotary valve being at an angle to the reciprocable motion of said pistons, said bomb valve means further comprises a bomb valve member rotatably mounted in a cylindrical bomb valve chamber adjacent said cylinder, a gas inlet passage communicating said cylinder to said bomb valve chamber, said bomb valve member also having a gas inlet port communicating said gas space to said bomb valve chamber and alignable with said gas inlet passage to admit and release said portion of combustion products and unburned air-fuel mixture into said cylinder, wherein said cylinder includes a single intake-exhaust passage communicating said cylinder with said rotary valve means, and said rotary valve means further comprises an intake aperture rotatable over and alignable with said intake-exhaust passage, an intake opening rotatable over and alignable with said intake means, an axially extending intake passage communicating said intake aperture with said intake opening for providing a passage for an air-fuel mixture between said intake means and said cylinder, an exhaust aperture circumferentially spaced from said intake aperture and in the same diametric plane rotatable over and alignable with said intake-exhaust passage, an exhaust opening rotatable in the vicinity of said exhaust means, an axially extending exhaust passage communicating said exhaust aperture with said exhaust opening for providing a passage for the combustion product from said cylinder to said exhaust means, and, an exhaust cover extending radially outwardly from said rotary valve and partially covering said exhaust opening to violently agitate the combustion products as they leave said cylinder to produce a recombustion in the vicinity of said exhaust opening.

6. A multi-stroked internal combustion engine, according to claim 5, wherein said bomb valve member for said cylinder is connected and are rotatable in axial alignment with said rotation of said rotary valve.

7. In an internal combustion engine, comprising a plurality of cylinders disposed substantially in line, a plurality of pistons reciprocable in said cylinders from a top stroke position to a bottom stroke position, a rotary valve housing disposed above and along said cylinders, a rotary valve member rotatably mounted in said rotary valve housing, the improvement comprising a bomb valve housing disposed along said cylinders adjacent the bottom stroke position of said pistons, a bomb valve member rotatably mounted in said bomb valve housing, said rotary valve housing having an inlet hole and an exhaust hole associated with each cylinder, said cylinders each having a single inlet-exhaust passage adjacent the top position of said piston, communicating said cylinder to said rotary valve housing, said rotary valve member having an intake passage with a first end opening alignable with said inlet-exhaust passage of said cylinder and an opposite second end opening axially spaced from said first intake passage and opening alignable with said inlet hole of said rotary valve housing, said rotary valve member further having an exhaust passage circumferentially spaced from said intake passage with a first passage end opening alignable with said inlet exhaust passage and a second end opening axially spaced from said first exhaust passage and opening alignable with said exhaust hole of said rotary valve housing, a portion of said rotary valve member circumferentially aligned with said second end opening of said intake passage forming a cover for said intake hole of said rotary valve housing when said intake passage end openings are not aligned with said inlet-exhaust passage and said exhaust hole, respectively, said exhaust passage of said rotary valve member further comprising an exhaust cover adjacent its said second end opening extending radially outwardly from said rotary valve member and ending in spaced relationship with said rotary valve housing to induce agitation of exhaust products and enhance combustion thereof in said rotary valve housing, said bomb valve housing having a plurality of gas passages communicating it with each of said cylinders adjacent said bottom position of said pistons, and said bomb valve member having an internal gas space associated with each cylinder with a gas inlet opening alignable with said gas passage of each cylinder to communicate said cylinder with said gas space.

* * * * *